(12) United States Patent
Muhlheim et al.

(10) Patent No.: US 9,914,057 B2
(45) Date of Patent: *Mar. 13, 2018

(54) IMMERSIVE STORYTELLING ENVIRONMENT

(71) Applicant: Disney Enterprises, Inc., Burbank, CA (US)

(72) Inventors: Eric Wilson Muhlheim, Los Angeles, CA (US); Eric Charles Haseltine, Silver Spring, MD (US); Joseph O'Brien Garlington, La Crescenta, CA (US); Theodore Wei-Yun Leung, Bainbridge Island, WA (US); Gabriel Sebastian Schlumberger, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,072

(22) Filed: Jun. 30, 2017

(65) Prior Publication Data

US 2017/0296922 A1 Oct. 19, 2017

Related U.S. Application Data

(63) Continuation of application No. 14/026,488, filed on Sep. 13, 2013.
(60) Provisional application No. 61/703,228, filed on Sep. 19, 2012.

(51) Int. Cl.
*A63F 13/53* (2014.01)
*A63F 13/537* (2014.01)
*G11B 27/034* (2006.01)
*G11B 27/10* (2006.01)
*G11B 27/34* (2006.01)
*A63F 13/50* (2014.01)

(52) U.S. Cl.
CPC ............ *A63F 13/53* (2014.09); *A63F 13/50* (2014.09); *A63F 13/537* (2014.09); *G11B 27/034* (2013.01); *G11B 27/105* (2013.01); *G11B 27/34* (2013.01); *A63F 2300/1093* (2013.01); *A63F 2300/405* (2013.01); *A63F 2300/6045* (2013.01); *A63F 2300/632* (2013.01); *A63F 2300/69* (2013.01)

(58) Field of Classification Search
CPC ..................................................... A63F 13/53
USPC ........................................................ 434/308
See application file for complete search history.

(56) References Cited

U.S. PATENT DOCUMENTS

2004/0117190 A1* 6/2004 Baumert ................ G10L 15/26
704/275

OTHER PUBLICATIONS

Fontijin, et al., "StoryToy the Interactive Storytelling Toy", 3rd International Conference on Pervasive Computing, 2005, 6 pages.*

* cited by examiner

*Primary Examiner* — Thomas Hong
(74) *Attorney, Agent, or Firm* — Patterson + Sheridan, LLP

(57) ABSTRACT

Techniques for providing an immersive storytelling experience using a plurality of storytelling devices. Each of the storytelling devices may be configured to perform one or more actions based on a current context of a story and in response to a stimulus event. The actions include at least one of an auditory and a visual effect. Embodiments also provide a controller device configured to manage a playback of the story, by adjusting the stimulus event and the effect of each of the plurality of storytelling devices, based on the current context of the story, thereby creating an interactive and immersive storytelling experience.

20 Claims, 7 Drawing Sheets

IMMERSIVE STORYTELLING ENVIRONMENT

CROSS-REFERENCE TO RELATED APPLICATIONS

This application is a continuation of co-pending U.S. patent application Ser. No. 14/026,488, filed Sep. 13, 2013, which claims benefit of U.S. provisional patent application Ser. No. 61/703,228, filed Sep. 19, 2012. Each of the aforementioned related patent applications are herein incorporated by reference in their entirety.

BACKGROUND

Field of the Invention

The present invention generally relates to a home entertainment, and more specifically to techniques for providing an immersive storytelling environment using storytelling devices.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

While video games may allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment provides a system that includes a plurality of storytelling devices. Each of the storytelling devices is configured to produce an effect based on a current context of a story in response to detecting an occurrence of a stimulus event. The effect is at least one of an auditory and a visual effect. At least one of the respective stimulus events for each of the plurality of electronic devices comprises detecting, based on data values collected from one or more sensor devices, performance of a user action by a first user in a physical environment in which the plurality of electronic devices and the first user are located. The system further includes a controller device configured to determine that the plurality of electronic devices are present in the physical environment and are available and compatible with the story, through wireless communication with each of the plurality of electronic devices, and manage a playback of the story within the physical environment, by transmitting one or more instructions to each of the plurality of electronic devices to adjust the stimulus event and the effect of each of the plurality of electronic devices, based on the current context of the story. Additionally, during the playback of the story, the controller device is configured to determine that a first one of the plurality of electronic devices has become unavailable and adjust the playback of the story within the physical environment, by transmitting one or more instructions to each of a second plurality of electronic devices, non-inclusive of the first electronic device, to update the stimulus event and the effect of each of the second plurality of electronic devices, based on an updated context of the story.

Additional embodiments provide a method and computer-readable medium that include providing a plurality of electronic devices, each configured to produce an effect based on a current context of a story in response to a stimulus event, wherein the effect is at least one of an auditory and a visual effect, and wherein at least one of the respective stimulus events for each of the plurality of electronic devices comprises detecting, based on data values collected from one or more sensor devices, performance of a user action by a first user in a physical environment in which the plurality of electronic devices and the first user are located. The method and computer-readable medium include determining that the plurality of electronic devices are present in the physical environment and are available and compatible with the story, through wireless communication with each of the plurality of electronic devices. Additionally, the method and computer-readable medium include transmitting one or more instructions to each of the plurality of electronic devices to manage a playback of the story within the physical environment, by adjusting the stimulus event and the effect of each of the plurality of electronic devices, based on the current context of the story. The method and computer-readable medium also include, during the playback of the story, determining that a first one of the plurality of electronic devices has become unavailable, determining that a second electronic device, distinct from the electronic devices in the plurality of electronic devices is present within the physical environment and is currently available and compatible with the story, and adjusting the playback of the story within the physical environment, by transmitting one or more instructions to each of a second plurality of electronic devices, non-inclusive of the first electronic device and inclusive of the second electronic device, to update the stimulus event and the effect of each of the second plurality of electronic devices, based on an updated context of the story.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
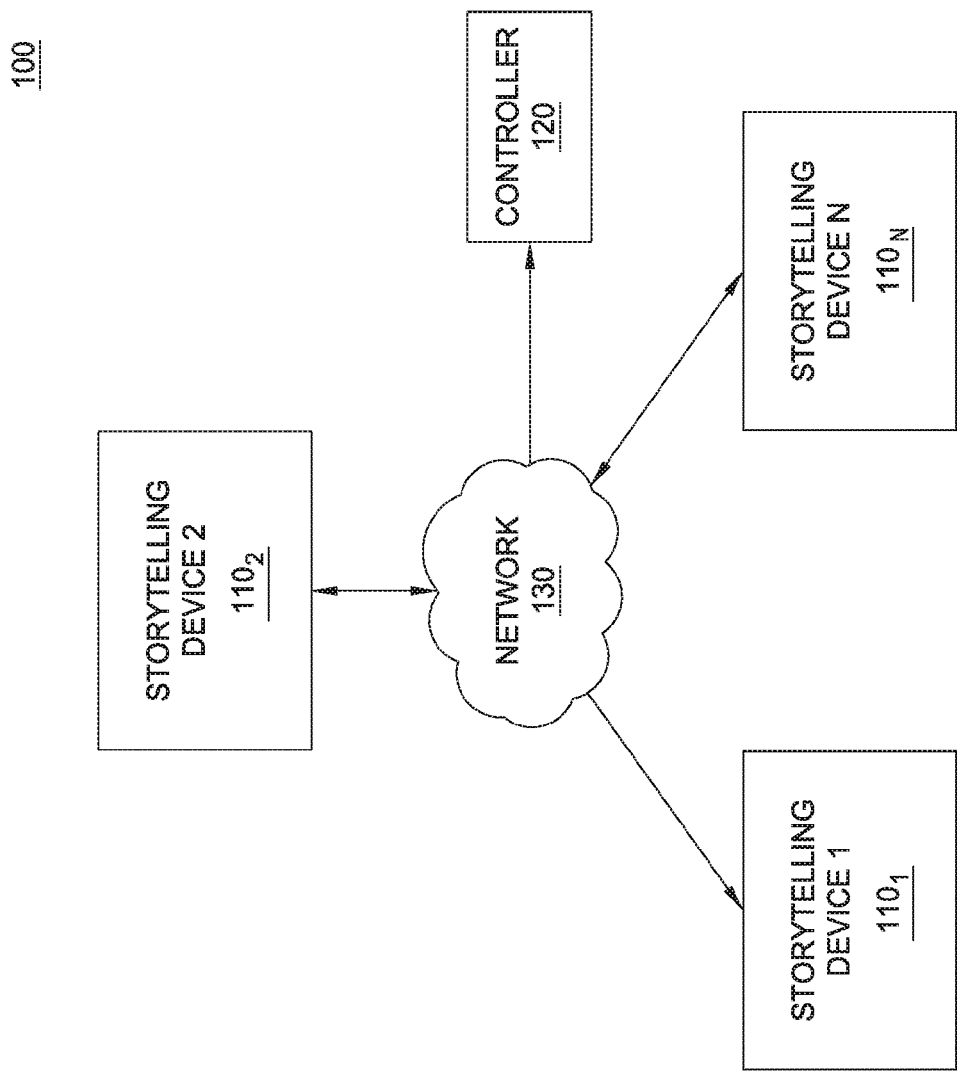
FIG. 1 is a block diagram illustrating a storytelling environment including a plurality of storytelling devices, according to one embodiment described herein.

Generally, embodiments provide techniques for creating an immersive storytelling environment using one or more storytelling devices. More specifically, embodiments may use various storytelling devices, each capable of producing some auditory and/or visual effect, to create an immersive and interactive storytelling experience for a user. An example of this can be seen in FIG. 1, which is a block diagram illustrating a storytelling environment including a plurality of storytelling devices. The system 100 includes a plurality of storytelling devices $110_{1-N}$ and a controller 120, interconnected via a network 130. Here, each of the storytelling devices $110_{1-N}$ generally represent any device that is capable of making a contribution to a storytelling experience, responsive to some form of stimulus and a current context of a story. For instance, the controller device 120 could configure each of the storytelling devices $110_{1-N}$ with stimulus and response information, based on a current context of a story. As an example, the controller device 120 could configure a particular storytelling device to take a certain audiovisual action responsive to a certain stimulus event (e.g., a user performing a particular action), and to perform another audiovisual action responsive to another stimulus event (e.g., the user not performing the particular action within a predefined window of time).

When a user indicates that he wishes to begin the immersive storytelling experience for a particular story, the controller device 120 could detect all the storytelling devices $110_{1-N}$ available in the user's physical environment (e.g., in the room of the user's house where the user is currently standing). Additionally, the controller device 120 could determine which of the available storytelling devices $110_{1-N}$ are compatible with the particular story. Once the compatible storytelling devices $110_{1-N}$ are identified, the controller device 120 could initiate the immersive storytelling experience for the user, using the identified storytelling devices $110_{1-N}$.

As mentioned above, the controller device 120 could configure each of the storytelling devices $110_{1-N}$ to perform certain actions in response to a detected stimulus event and a current context of the story being told. Here, the story may include a number of different contexts in a temporal order, and the playback of the story may advance from one context to the next until the last context is reached and the storytelling experience is complete. However, while the story may be linear in progression, this is not necessarily the case. For example, one embodiment provides a story having one or more branches, where the story can proceed down one of a plurality of different arcs. For instance, one of the arcs could be selected based on a selection algorithm (e.g., randomly selecting one of the arcs), a user's request (e.g., the user specifying which arc should be taken), the user's actions (e.g., the user manages to "rescue" one of the fictional characters in the story), the user's history of actions (e.g., whether the user is trending towards the "dark side" in a Star Wars® storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

For example, a storytelling device could be in the shape of a magic lamp, and the stimulus event could be a user action within a physical environment in which the storytelling device is located (e.g., a user rubbing a surface of the magic lamp device). As another example, the stimulus event could be an action performed by another one of the storytelling devices. To perform the action(s) responsive to the detected stimulus event, the magic lamp device could be configured to project (i.e., using one or more projectors within the lamp or otherwise present within the physical environment) a depiction of a genie above the lamp. For instance, the depiction could be a virtual or real image projection that creates the appearance (or illusion) of a real or holographic image existing in and interacting with the physical world. Additionally, the magic lamp device could include an auditory device(s) (e.g., a speaker, resonant cavities, etc.) capable of playing sounds. For instance, the magic lamp device could use the auditory device(s) to play sounds synchronized with the projection of the genie depicting the genie's voice.

As part of the storytelling experience, the storytelling devices $110_{1-N}$ may appear to interact with one another and the user, using various input/output components. Continuing the above example of a magic lamp device, the device could be configured with a vibration mechanism (e.g., a gear coupled to an off-center weight), such that the magic lamp could appear to shake while the genie is "locked" inside the lamp. The lamp could also include a touch-sensitive surface that could be used to detect when the user rubs on the lamp. As an example, the lamp could appear to shake and rattle on the table, and could play sound effects depicting the genie asking the user to "Let me out of here!" The lamp could then detect when the user rubs on the side of the lamp with the user's hand (i.e., an occurrence of a stimulus event) and, in response, could project the holographic depiction of the genie above the lamp. The holographic genie projection could then thank the user for freeing him from the lamp (i.e., an action performed responsive to the occurrence of the stimulus event), and the story could continue.

Throughout the storytelling experience, portions of the story may require some action by the user before the story will continue. As an example, the storytelling device could require that the user find a particular object (e.g., a magic talisman) before the story can continue. Such an object could be, for instance, a physical object that was previously hidden in the physical environment (e.g., by the user's parent or guardian) or could be a virtual object seen with an augmented reality device. The storytelling device (or a controller device) could determine the hidden object's real-world position within the physical environment, for example, by receiving global positioning system (GPS) corresponding to the hidden object (e.g., determined by and received directly from the hidden object itself, received from a controller device, etc.) and by determining GPS coordinates associated with the storytelling device. The storytelling device (or a controller device) could then use the two sets of GPS coordinates to determine the hidden object's position relative to the storytelling device. The storytelling device (or a controller device) could further determine the user's position relative to the storytelling device (e.g., using GPS coordinates associated with the user, based on images captured using one or more cameras of the storytelling device, etc.), and from these two relative positions, could determine the hidden object's position relative to the user. As the user gets closer to the object, the storytelling device (or a controller device) could monitor the user's position and provide guidance to help the user find the object. For instance, as the user gets closer to the object, the storytelling device could inform the user that the user is getting "hotter", and as the user gets further from the object, the storytelling device could inform the user that he is getting "colder."

In one embodiment, the user may be given a choice between multiple different actions, and the action the user chooses may influence the outcome of the story. That is, depending on which action the user chooses, the controller device 120 could configure the storytelling devices 110$_{1-N}$ differently, based on a corresponding storyline arc of the story. In such an example, when advancing from one context of the story to the next, the controller device 120 could select one of a plurality of next contexts to advance to, based on the stimulus event detected. For instance, once the user finds the magic talisman, the genie could inform the user that the power of the talisman may be used to stop an evil plan of the story's antagonist, or that the talisman could be destroyed in order to stop the antagonist's plot. The user may then inform the genie (e.g., with a verbal statement detected with one or more microphones) of the user's choice, and the controller 120 could advance the story a next context corresponding to the user's choice and could configure the storytelling devices 110$_{1-N}$ accordingly, allowing the remainder of the story to play out differently depending on the path chosen by the user.

Generally, the storytelling devices 110$_{1-N}$ can interact visually with the user as part of the storytelling experience. For instance, using the example above of a magic lamp storytelling device, storytelling device could track the user's position (e.g., using one or more boresighted cameras within the device—i.e., a camera configured to view the area that a projector is configured to project onto) and could project the depiction of the genie (e.g., using image projection techniques creating the appearance of real or holographic images within the real world) such that the genie appears to follow the user around the room as the user searches for the magic talisman. The storytelling device could also use the user's position to cause the projected genie to face the user when speaking to the user, helping to enhance the realism of the storytelling experience. The genie could be rendered as exasperated or frustrated when the user gets further away from the hidden talisman, and could be rendered as encouraging or cheering the user on as the user gets closer to the talisman.

In one embodiment, one of the storytelling devices 110$_{1-N}$ is configured with an audio device(s) capable of localized sound (i.e., sound that appears to emit from the storytelling device), non-localized sound (i.e., sound where it is difficult to determine the input direction), or both. Generally speaking, localized sound may come from speakers producing mid- and high-range frequencies, while non-localized sound may come from speakers producing low-range frequencies. More generally, it is broadly contemplated that any techniques, known or unknown, for producing localized sound and/or non-localized sound may be used consistent with the present disclosure.

Embodiments may use localized sound and non-localized sound (e.g., sounds of different frequencies) to create particular effects in the immersive storytelling environment. For instance, while the genie is "locked" in the lamp, the lamp device could project sound depicting the genie's voice using localized sound, so that the genie's voice appears to be coming from the lamp. On the other hand, when the user is invoking the power of the magic talisman, the lamp could project sound effects for the talisman using non-localized sound, so that the sound effects appear to be coming from all around the user. Advantageously, by altering the perceived location of the sound source, embodiments may create a more immersive and enhanced storytelling experience.

The storytelling device could then use the image and voice/sound recognition features to provide personalized, context-aware storytelling. Additionally, such recognition features can greatly simplify the user's task of setting up and maintaining the storytelling system. Such setup automation could be used to effectively render the setup of a complex, multi-element storytelling environment fun and simple for the user. For example, image recognition technology could be used in conjunction with geolocation systems to automatically tell the storytelling device to tailor the story content to a child's bedroom (e.g., versus the family room), obviating the need for a user to manually tell the storytelling device where it is located and what other storytelling devices are in the immediate environment.

Additionally, as discussed above, the storytelling devices 110$_{1-N}$ may interact with one another in creating the immersive storytelling experience. For instance, the storytelling device 110$_1$ could be a mechanized stuffed animal (e.g., a monkey) capable of performing gestures and other movements (as well as auditory expressions) in response to particular stimuli. For instance, the mechanized monkey stuffed animal 110$_1$ could be capable of walking around using its legs (and potentially its arms as well), and could be capable of moving its arms, legs, head and torso in various ways, giving the appearance of various gestures and facial expressions. In the present example, the mechanized monkey device 110$_1$ could track the user's movement around the physical environment (e.g., using one or more cameras) and could follow the user around the room as the user searches for the magic talisman. In doing so, the device 110$_1$ and/or the controller device 120 could track the device's 110$_1$ position as well as the position of the magic talisman device. The monkey stuffed animal 110$_1$ could also be configured to perform actions responsive to detecting an occurrence of a stimulus event, in order to give hints to the user (e.g., upon detecting that the user has been searching for the hidden object for longer than a threshold amount of time). For instance, if after 20 seconds the user has not found the hidden talisman, the monkey stuffed animal $110_1$ could begin jumping up and down, pointing in the direction of the hidden talisman, and making noises to attract the attention of the user.

Generally, it is broadly contemplated that a storytelling device may react differently to a given stimulus event, based on a current context of the story, and the controller 120 may configure the storytelling devices $110_{1-N}$ to recognize different stimulus events and to perform different actions in response, as the story plays out. For instance, in the above example, the monkey stuffed animal device could be configured to react in fear of the genie when the genie first appears (i.e., a first stimulus event at a first context within the story). However, at a later point in the story where the genie comes to the user's aid, the monkey device could be configured to react gratefully (i.e., a second stimulus event at a second context within the story). As another example, the magic lamp storytelling device (e.g., the storytelling device $110_2$) could be configured to react in a particular way when the user first rubs the lamp (e.g., by displaying a holographic image of the genie appearing above the lamp), but could react in a different way (or not at all) in a different part of the story. Advantageously, doing so allows the storytelling devices to react in a realistic and expected fashion, depending on a current context of the story.

The controller 120 generally contains logic for managing the storytelling experience. This may include, for instance, managing the actions of the various storytelling devices $110_{1-N}$ and coordinating how the storytelling devices $110_{1-N}$ interact with one another and with the user based on the current context of the story. For instance, the controller 120 could transmit, to each of the storytelling devices $110_{1-N}$, data defining the actions and corresponding stimuli that the respective device should use as part of the storytelling experience. For instance, such data may specify, without limitation, one or more frames to project, where to project such frames, auditory sounds to play, a frequency at which to play the sounds (e.g., localized versus non-localized sound), and a movement action (e.g., walking, gesturing, vibrating, etc.). In such an embodiment, each storytelling devices $110_{1-N}$ could only contain data relating to its own individual actions, rather than the entirety of the story and the actions and stimuli involved in the story. The devices $110_{1-N}$ could then perform the specified actions in response to detecting the corresponding stimuli, thereby creating the immersive storytelling environment.

Generally, a variety of different stimuli (also referred to herein as stimulus events) may be used in accordance with embodiments described herein. For instance, one stimuli could be a visual stimuli detected using one or more cameras within a storytelling device 110. As an example, the storytelling device 110 could monitor a user's position as the user walks around the room by capturing different images of the room using several different cameras positioned at different angles. The storytelling device 110 could then make contextually-appropriate comments to the user, based on the user's determined position. For instance, as the user gets further away from a hidden object that the storytelling device 110 knows the location of (e.g., based on a comparison between a GPS coordinates received from the hidden object and GPS coordinates determined for the storytelling device 110), the storytelling device 110 could comment (e.g., by emitting sound from one or more speakers) that the user is getting "colder" in his search for the hidden object.

Another example of a stimulus is an action taken by another one of the storytelling devices 110. For instance, when the user rubs the magic lamp device and the projection of the genie appears, the monkey stuffed animal device could emit a frightened noise (e.g., "Eek!") and could cover its eyes with its hands. The occurrence of the action by the other storytelling device 110 could be conveyed in a number of ways. For instance, the monkey device could detect that the genie projection has appeared, by analyzing images captured using one or more cameras.

As another example, the magic lamp device could be configured to transmit a signal to the monkey device, indicating that the genie projection action has been performed. The monkey device could then react to the genie's appearance, based on the received signal. As discussed above, the action performed responsive to the detected stimulus event may depend on a current context of the story being told. That is, while the monkey device may react in fright when the genie first appears (i.e., a first context within the story), the monkey device may react in relief later in the story when the genie comes to the user's aid against the antagonist of the story (i.e., a second context within the story).

In a particular embodiment, rather than transmitting a signal directly to the other storytelling devices, the magic lamp device could transmit the signal to the controller 120, and the controller 120 could determine which, if any, other storytelling devices 110 need to be made aware of the occurrence of the event. That is, a centralized model could be employed where each storytelling device communicates with the controller 120, rather than a peer-to-peer model in which each storytelling device communicates directly with the other storytelling devices. For instance, the controller could maintain data specifying which storytelling devices 110 are capable (in the context of a given story) of reacting to a particular stimulus event. Upon receiving a signal indicating that a particular action has been performed, the controller 120 could use such data to determine which device(s) should react to the event and informs those device(s) of the occurrence of the event. In one embodiment, the controller 120 may select a subset of the devices capable of reacting to the event, and may inform only the selected devices of the occurrence of the event. For example, if the controller 120 determines that six different storytelling devices 110 present in the physical environment (e.g., the user's room) are capable of reacting to the appearance of the genie, the controller 120 may determine a subset of these devices to react to the genie's appearance. Such a subset could be selected, for instance, based on a priority value associated with each device's 110 response action to the stimuli. In one embodiment, the devices 110 to react to the stimuli are selected randomly (or pseudo-randomly).

The controller 120 may also determine, for each available device 110 capable of reacting to the event, whether the device 110 should perform the entirety of its responsive actions in reacting to the event. That is, the controller 120 could specify that certain available devices 110 should only perform a portion of their responsive actions, in response to the detected stimuli. For instance, assume that the controller 120 determines that there are six different storytelling devices 110 present in the physical environment that are capable of reacting to the appearance of the genie, and that all six devices 110 have both an auditory and a physical reaction to the genie's appearance. Here, the controller 120 could select a sub-set of the devices 110 (e.g., only the monkey device) to react in an auditory fashion, but could determine that all six of the devices 110 should perform their physical reaction to the genie's appearance. Advantageously, doing so helps to ensure that all available storytelling devices 110 capable of doing so will react to the stimuli in some form, while making sure that the storytelling devices 110 do not "talk over" each other, making each device's auditory contribution difficult to understand.

Generally, the controller 120 may be implemented in a number of different ways. In one embodiment, the controller 120 resides within one of the storytelling devices $110_{1-N}$. One advantage to such an embodiment is that no additional setup on the user's part may be required before the storytelling experience begins. That is, the user could purchase the storytelling device containing the controller 120, and when the user activates the storytelling device (e.g., by powering it on), the controller 120 could detect what other storytelling devices $110_{1-N}$ are present within the user's home (e.g., through wireless communications) and could automatically adapt the storytelling experience accordingly. However, from the user's experience, the user merely powers the device containing the controller 120 on and the story begins.

In a particular embodiment, the controller 120 comprises software executes on a computing device. For example, the user could download a software application on a personal computing device or tablet computing device that, when executed, serves as the controller 120. Such an embodiment may require the user to download or install a software application before beginning the storytelling experience. However, one advantage to using software on a personal computer as the controller 120 is that the software application can take advantage of the processing power of the user's personal computer, thereby avoiding any additional cost of adding separate controller logic to one of the storytelling devices $110_{1-N}$.

Generally, the controller 120 may maintain data related to a multitude of different stories. For each story, the controller 120 could maintain data specifying a list of storytelling devices 110 that are compatible with the story, and may maintain a respective set of actions and corresponding stimulus events for each compatible device. Additionally, some stories may include different branches, in which the story can play out in different ways depending on the choices a user makes and/or the actions the user takes.

For instance, the stories are provided to the controller 120 as they are released (e.g., the controller 120 could automatically download the newly released stories from a remote website). In a particular embodiment, stories associated with a particular storytelling device may be automatically unlocked when the user purchases and registers such a storytelling device with a content server. In one embodiment, the controller 120 is configured to download only stories that the user has purchased. For instance, the user could maintain an account with the remote story server (e.g., a website). If the user selects a given story for playback, the controller 120 could query the remote website to determine whether the user has already purchased the selected story, based on the user's account with the website. If the user has already purchased the story, the controller 120 could begin interactively telling the story using the available storytelling devices. If the user has not yet purchased the story, the controller 120 could prompt the user as to whether the user wishes to purchase the story.

In one embodiment, the controller 120 is configured to automatically purchase the story on the user's behalf when the user selects a story he has not yet purchased. In a particular embodiment, the stories are provided to the user using a subscription model. That is, the user could periodically pay a subscription fee (e.g., monthly) and new stories could be periodically released on the remote website. So long as the user's subscription is paid, the controller 120 could automatically download the new stories from the remote website, so that the new stories are ready for playback when the user next wishes to use the storytelling device(s).

In one embodiment, users may purchase alternate actions, behaviors and/or dialogue options for their storytelling devices. Generally, it is completed that any content associated with the storytelling experience may be locked or unlocked in various ways and for various reasons, consistent with the functionality herein. For instance, content (e.g., stories, behaviors, dialogue, etc.) may be unlocked based on the user's previous actions in the storytelling environment. For instance, in a Star Wars® themed storytelling environment, the controller 120 could unlock various Sith-themed stories if the user is trending towards the "dark side", based on the user's past actions in previously played stories.

More generally, it is contemplated that any revenue model, known or unknown, may be employed in the distribution of stories. Exemplary revenue models include, but are not limited to, a pay-per-use model (e.g., a fee is assessed each time the user plays through a story), a micropayment model (e.g., chapters within a single story could be purchased individually, special characters within a single story could be unlocked using digital currency, etc.), virtual good purchases (e.g., special items which influence the playback of a story could be unlocked, either with a purely virtual currency and/or a digital currency linked to real currency, etc.), advertising models (e.g., targeted product placement within the context of a given story, an advertisement depicted using visual and/or audible playback from a storytelling device(s), etc.) and a viral marketing model (e.g., a story could be unlocked for users who transmit advertising and/or purchasing opportunities to one another).

In one embodiment, a physical item can be used to unlock digital (and/or virtual) content. For instance, a plastic chip could be provided (e.g., for sale at retail stores) that is configured to plug into a particular slot on one of the storytelling devices. As an example, an electronic or electromechanical (e.g., a key with particularly arranged slots) could be plugged in to one of the storytelling devices to unlock content. The controller 120 could detect when the chip has been plugged into one of the storytelling devices and could further detect a type of the chip (e.g., based on data specified on a memory within the chip, based on the construction and/or shape of the chip, etc.). The controller 120 could then unlock content corresponding to the detected type for use by the user. For example, such content could include a new storyline that can be played out by the storytelling device having the chip, and the controller 120 could download such a storyline (e.g., from a remote server) responsive to the chip being inserted into the storytelling device. As another example, the unlocked content could include new behaviors and/or dialogue for the storytelling device. More generally, it is broadly contemplated that any content can be unlocked by the physical device, consistent with the functionality herein.

Additionally, the physical object or device need not plug into or otherwise physically connect with the storytelling device in order to unlock content. For example, the storytelling device could receive a signal (e.g., an RF or RFID signal) that indicates particular content should be unlocked. As an example, a signal could be broadcast at a particular Star Wars®-themed attraction at a theme park, and any Star Wars®-themed storytelling device receiving the signal could be configured to unlock particular content in response. As an example, a new storyline could be unlocked upon receipt of the signal. As another example, the storytelling device could perform certain actions (e.g., gestures, dialogue, etc.) in response to receiving the signal.

Moreover, it is broadly contemplated that stories may be provided by any number of parties. For example, in one embodiment, a single story developer controls the creation, production, and release of stories onto the market for the storytelling system. In another embodiment, a marketplace could be provided in which developers, retailers, users and hobbyists can work collectively to create and distribute custom stories to other various users. Such custom stories could be distributed free of charge or could be distributed using any pricing model, known or unknown, consistent with the present disclosure. Additionally, the marketplace could be moderated to ensure the distributed stories are content-appropriate. For example, moderators could assign ratings to individual stories (e.g., ratings similar to Motion Picture Association of America ratings for films) and users could be informed of these ratings before viewing a particular story. In such an embodiment, particular users (e.g., children) may be restricted from viewing stories with certain ratings. In one embodiment, moderators may only allow "approved" stories onto the market place. For instance, moderators could only approve youth-appropriate stories for distribution, thereby insuring that any and all content distributed on the marketplace is appropriate for users of all ages.

Generally speaking, the storytelling devices 110 and the controller 120 may be stateful devices. That is, these devices $110_{1-N}$ and 120 may maintain state data relating to a current playback position within a given story, and this state data may be maintained when if the user suspends playback of the story. Thus, the user could pause the interactive playback of a particular story at some playback position (e.g., 20 minutes into the story), and when the user next initiates the playback of the particular story, the playback could resume at approximately the previous playback position (e.g., exactly at the previous playback position, slightly before the previous playback position, slightly after the previous playback position, etc.).

Additionally, such state data may specify particular events that have occurred (e.g., interactions with a user) and could be used to improve the storytelling experience for the user. For instance, a virtual character (e.g., projected into the physical world, shown on an augmented reality device, etc.) could be configured with a variety of different phrases that can be used in reacting to a given stimulus event. In such an embodiment, a storytelling device 110 associated with the virtual character could maintain state data specifying which of the phrases the virtual character has used recently, and could avoid using these recently used phrases in responding to subsequent occurrences of the stimulus event. Advantageously, doing so helps to ensure the dialogue between the virtual characters and the user is repetitive, and does not become stale or repetitive. Other state data could relate to, for example, customer relationship management (CRM) services and other personalization features, such as remembering the user's name, remembering the state of a room, remembering past activities and interactions occurring between a storytelling device(s) and a user(s), and likely or predicted future needs and desires for the user(s).

In one embodiment, an augmented reality device is used as one of the storytelling devices 110. As used herein, an augmented reality device refers to any device capable of displaying a real-time view of a physical, real-world environment or elements of a physical, real-world environment, while altering elements within the displayed view of the environment. As such, unlike a virtual reality device which displays a view of virtual world, an augmented reality device displays a view of the real world but augments elements using computer graphics technology. More generally, however, the augmented reality devices and the storytelling devices 110 can work to create a high-level form of augmented reality. For instance, by projecting images of virtual characters into the physical world to create the appearance of a three-dimensional holographic image, embodiments are able to augment the appearance of the physical world itself as perceived by the user, thereby creating a new form of augmented reality for the user.

For instance, continuing the aforementioned example of a user searching for a magic talisman hidden within his room, the user could search for the talisman using an augmented reality device. As an example, the user could walk around his room, viewing the room with the augmented reality device, and software on the augmented reality device could be configured to augment the displayed scene to include the augmented reality device, when a specific location of the user's room is viewed. Additionally, the depiction of the magic talisman on the display of the augmented reality device could appear to respond to interactions from the user. For instance, the augmented reality device could detect the appearance of the user's hand within captured visual scene (e.g., frames captured using a camera(s) of the augmented reality device) and could manipulated the appearance of the magic talisman within the display, such that it appears the user is touching and physically moving the virtual talisman. As an example, the user could reach out and grasp at the depicted location of the virtual talisman, and the augmented reality device could augment the depiction of the user's hand on the augmented reality device's display, such that it appears the user is holding the talisman in his hand. The user could then walk around his room carrying the talisman (as shown on the augmented reality device).

Figure 2:
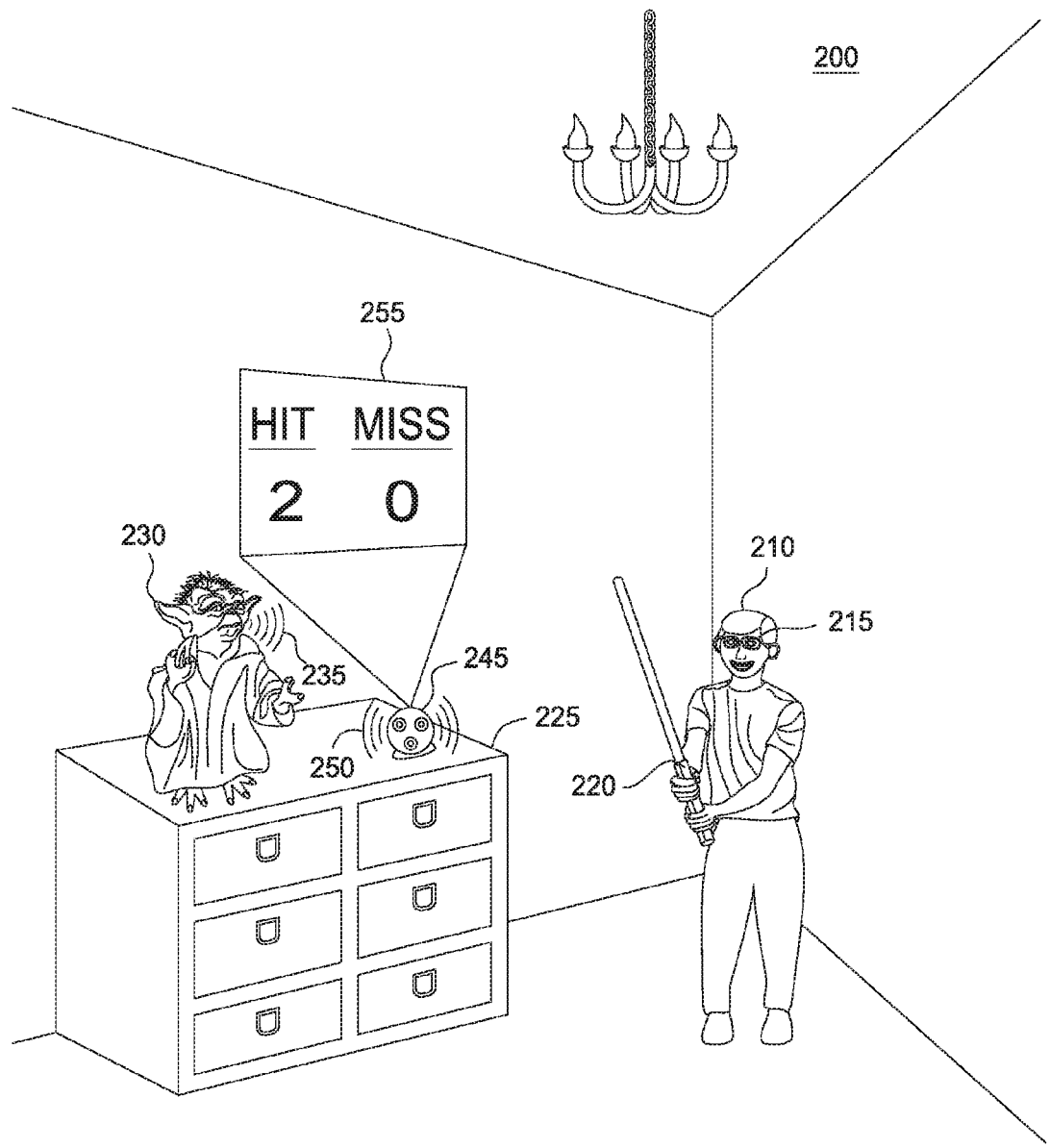
FIG. 2 is a use case illustrating a plurality of storytelling devices interacting with each other to playback a story, according to one embodiment described herein.

An example of one such augmented reality device is shown in FIG. 2, which illustrates a Star Wars® themed use case using a plurality of storytelling devices to playback a story. As shown, the screenshot 200 includes a Yoda storytelling device 230, a trainer storytelling device 245 sitting atop a dresser 225, and a user 210 holding a lightsaber storytelling device 220. Additionally, the user 210 is shown as wearing a pair of augmented reality glasses 215. In other embodiments, other forms of augmented reality devices (e.g., mobile phones or tablet computing devices configured with an augmented reality component) may be used in a similar fashion to the augmented reality glasses 215.

Generally, the lightsaber device 220 may include an accelerometer, a speaker(s), a GPS device, and/or a vibration mechanism for use in detecting stimulus events and responding in kind. For instance, the accelerometer could track the movements of the lightsaber device 220 in order to trigger a stimulus event, such as the user performing a particular event with the lightsaber device 220. Likewise, the GPS device could allow a location of the lightsaber 220 to be determined in order to trigger a stimulus event, such as a story where the lightsaber device 220 has been hidden (e.g., by the user's parents) and the user is sent on a mission by the Yoda device 230 in order to find the lightsaber 220. For example, in such a story, a controller device could determine the lightsaber's 220 position via the GPS device within the lightsaber, and could further determine the position of the Yoda device 230 based on a GPS device within the Yoda doll 230. The Yoda device 230 could then make positionally accurate comments to assist the user in locating the user in finding the hidden lightsaber 220 (e.g., notifying the user when the user gets closer to the lightsaber device). The vibration mechanism could provide haptic feedback to the user when a certain stimulus event takes places. This stimulus event may include movement of the lightsaber 220, or contact from a physical or virtual object to the light saber 220.

Similarly, the Yoda device 230 may be capable of producing both auditory (e.g., speech via a speech synthesizer module) and visual effects (e.g., gestures and movement around the physical environment). Such auditory effects may be localized or non-localized, and generally such auditory effects will coincide with other storytelling devices in order to collaboratively tell a story. For instance, the Yoda device 230 could use a localized auditory effect for speech purposes, allowing the toy to appear to be talking. The Yoda device 230 could also include a camera for use in tracking the user's movement and the movement of the lightsaber device 220.

As an example, the Yoda device 230 could instruct the user 210 to perform particular exercises with the lightsaber device 220, and a controller device could track the movements of the lightsaber device 220 (e.g., via an accelerometer within the lightsaber device, via a camera within the trainer 245 or the Yoda device 230, etc.). One example of such an exercise includes deflecting a virtual laser fired from the training device 245 with the lightsaber device 220. For instance, the virtual laser could be inserted into the user's field of view by the augmented reality glasses 215, and the user could be required to move the lightsaber device 220 in a particular manner in order to deflect the virtual laser. In such an example, the Yoda device 230 could be configured to perform a particular action responsive to the user performing the exercise correctly (i.e., deflecting the virtual laser with the lightsaber device 220), such as praising the user's actions and advancing a context of the story. Here, the Yoda device 230 could monitor the user's movements of the lightsaber device 220 using a camera, and could determine when the user has made an appropriate physical movement with the lightsaber device 220 for the virtual laser shown within the augmented reality glasses 215. That is, if the virtual laser is shown on the user's left side, a controller device could use the camera to determine when the user has moved to the lightsaber device 220 to the user's left side within a predefined window of time. If the Yoda device 230 determines the user has moved the lightsaber device 220 in time, the Yoda device 230 could perform a corresponding action (e.g., praising the user for deflecting the laser).

Continuing this example, a controller device could notify other augmented reality devices when the user has successfully deflected the virtual laser. For instance, the controller could notify the training device 245 of the user's action, and the training device 245 could respond in turn. For example, the training device 245 could update the projection 255 to reflect how many times the user has successfully deflected a virtual laser versus how many times the user has missed the deflection. Likewise, the training device 245 could output an auditory effect 250, indicating that the user has successfully deflected the virtual laser. Moreover, the augmented reality glasses 215 could be configured to show the virtual laser bouncing off of the lightsaber device 220.

The devices could be configured to perform other actions responsive to the user incorrectly performing the action (e.g., the user failing to move the lightsaber device 220 to the appropriate position within the predetermined window of time). For instance, the Yoda device 230 could provide encouragement to the user, and the training device 245 could increment the miss counter of the projection 255. Similarly, when the user misses the deflection, the augmented reality glasses 215 could show the virtual laser flying off into the distance.

In addition, the augmented reality glasses 215 can be configured to show a number of augmentations to the user's physical environment in order to enhance the story. Doing so can provide a more realistic interaction between the user 210 and the interactive story. For instance, the augmented reality glasses 215 could change the scenery of the room to give the appearance that the user 210 is somewhere else. For example, the dresser 225 could be transformed into a giant log and the floor could be made to look like a bog, to give the appearance the user 210 is in a swamp. Likewise, the augmented reality glasses 215, in combination with the camera from the Yoda 230, could perform actions to simulate the user 210 using the "force" to deflect the virtual lasers and to interact with objects within the room.

Figure 3:
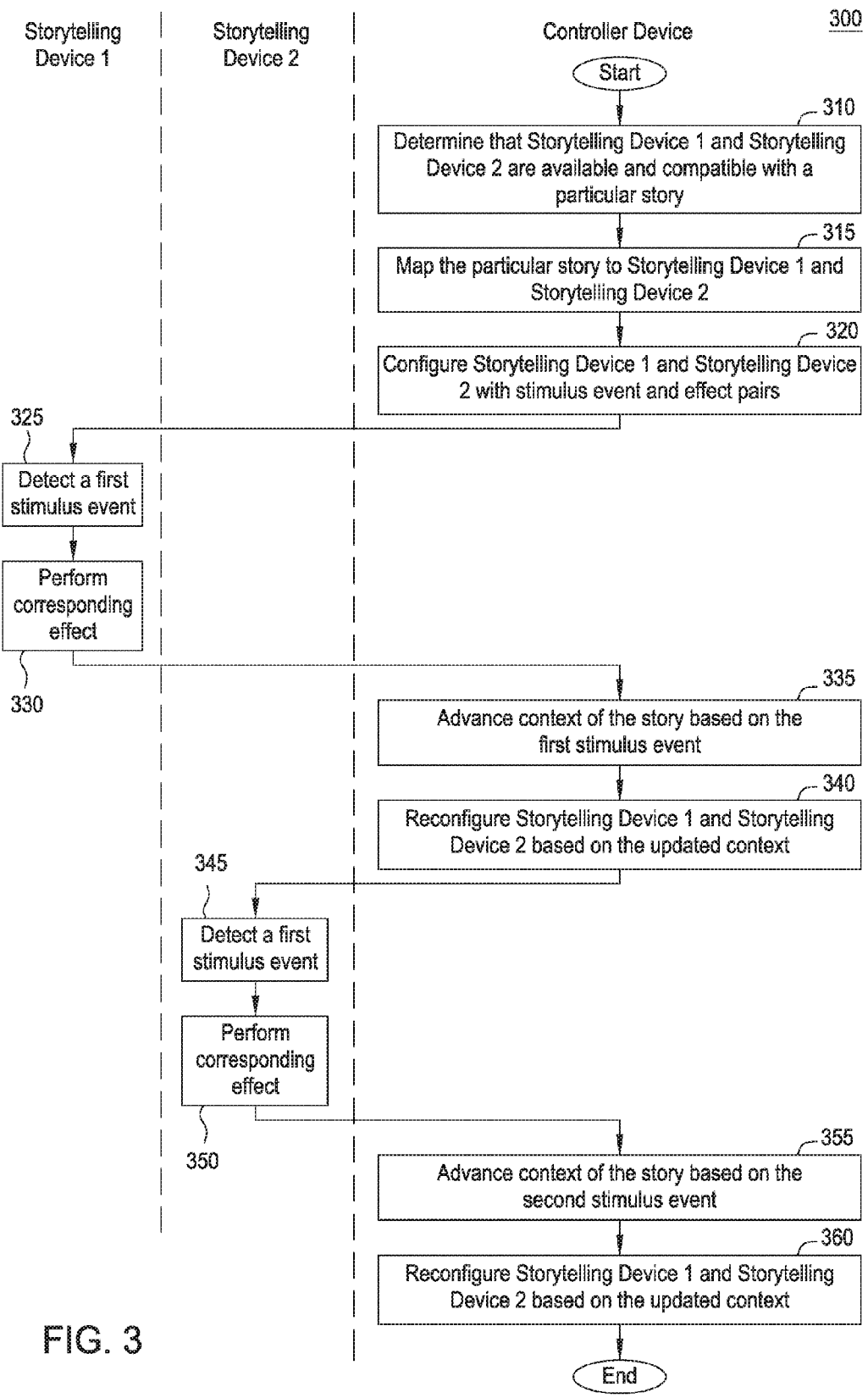
FIG. 3 is a flow diagram illustrating an interaction between storytelling devices and a controller device, according to one embodiment described herein.

FIG. 3 is a flow diagram illustrating an interaction between storytelling devices and a controller device, according to one embodiment described herein. As shown, the method 300 begins at block 310, where the controller device 120 determines that storytelling device 1 and storytelling device 2 are available within the physical environment and are compatible with a particular story. Here, a device may be considered "available" when, for example, the device is enabled (e.g., when the device is powered on), the device is idle (e.g., the device is not currently being used in another storytelling experience, the device is usable for the duration of the storytelling experience (e.g., the device has a sufficient power level to complete the story), and so on. Likewise, a device may be considered "compatible" with a story when the story contains stimulus events and corresponding actions associated with the device. For example, a particular story could relate specifically to the Yoda device 230 shown in FIG. 2 and discussed above. As another example, a story could relate to any Star Wars® hero devices, which would include the Yoda device 230 as well as various other Star Wars® characters.

Once the available and compatible devices are determined, the controller device 120 maps the particular story to the storytelling devices 1 and 2 (block 315). Generally, the story could include a number of different contexts having a temporal order, and each context could include plurality of stimulus events and corresponding actions. Here, playback of the story could include the controller device 120 advancing from one context to the next, while configuring the storytelling devices to execute the actions, responsive to detecting a corresponding stimulus event has occurred. Generally, the controller may advance the playback of the story from one context to the next based on the satisfaction of a particular stimulus event(s).

In mapping the story onto the available and compatible storytelling devices, the controller device 120 could determine a type of each of the storytelling devices, and could assign particular stimulus events and corresponding actions to each of the storytelling devices based on the determined type. For instance, assuming that the storytelling device represents the Yoda device 230, the controller 120 could assign any Yoda-specific stimulus events and actions within the story to the Yoda device 230. Likewise, if the story includes any stimulus events and actions designated for a Star Wars® hero device, the controller 120 could assign these stimulus events and the corresponding actions to the Yoda device 230 as well. In the event multiple storytelling devices are available that satisfy the criteria for a stimulus event/action combination (e.g., multiple Star Wars® hero devices are present and available within the physical environment), the controller device 120 could select one of the storytelling devices to perform each of the stimulus event/action combinations. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller 120 could determine that a particular story includes a stimulus event designated for a Star Wars® hero character, and could specify a corresponding action designated for a Yoda device 230 and a separate, distinct action designated for an Obi-Wan device. In such an embodiment, upon selecting one of the devices to respond to the stimulus event, the controller 120 could assign the corresponding action to the device based on the device's type. Doing so helps to create a more immersive and realistic storytelling experience for the user, as the storytelling devices can be configured to react to stimulus events in a manner appropriate for the represented fictional character.

Once the controller 120 maps the story onto the devices, the controller 120 configures each of the storytelling devices with a number of stimulus events and corresponding effects relating to a first context of the story (block 320). For purposes of this example, assume that the storytelling device 1 represents the Yoda device 230, and assume that the controller 120 configures the device 230 to detect when the user has properly deflected a virtual laser. In the method 300, the storytelling device 1 then detects the first stimulus event has occurred (block 325) and performs the corresponding effect (block 330). As an example, the Yoda device 230 could detect when the user has successfully deflected the virtual laser (i.e., an occurrence of the stimulus event), and could congratulate the user in response (i.e., performing the corresponding effect).

The controller 120 then advances a context of the story, responsive to the occurrence of the first stimulus event (block 335), and reconfigures the storytelling devices accordingly based on the next context of the story (block 340). That is, the controller 120 could configure the storytelling devices with stimulus event and corresponding effect pairs, based on the next context of the story. Here, the story could involve the user learning to use the lightsaber device 220, and could then advance to the user learning to use his "force" powers. Accordingly, the controller 120 could configure the trainer device 245 to detect when the user has performed a particular stimulus event (e.g., the user extending his hand towards the trainer device 245, as if using the "force" on the device 245), and to react accordingly (e.g., by vibrating through the use of a gear and weight combination within the device 245).

More generally, however, the context of the story may advance not solely based on the performance of a single stimulus event, but rather can advance based upon a number of factors. For example, the context of the story could advance based on an input from the user (e.g., the user could be given a choice of which arc the story should follow). Additionally, the context could advance based upon an overall state of the gameplay experience, which could include a state of and actions previously performed during the current story, as well as previous state and actions performed in previously played stories. For instance, the controller 120 could determine an aggregate state of the current story (e.g., by collecting state information from each storytelling device involved in the story) and could select one of a plurality of different arcs for the story based on the aggregate state information. As an example, the controller 120 could determine that a particular user has not been performing "good Jedi" actions during a current storytelling experience (and/or during previous storytelling experiences) and instead the user has been trending towards the "dark side." In response, the controller 120 could advance the context of the current story to an arc associated with the Sith, based on the user's previous actions in the current story and potentially previous stories as well. Such a different storyline arc could include, for example, different actions for the user to take, different dialogue from the storytelling devices, and so on. The controller 120 could also consider a user's personal information (e.g., birth date, age, etc.) and user profile information (e.g., specifying user preferences) in selecting a storyline arc.

Returning to the method 300, the method 300 continues as the storytelling device 2 detects a second stimulus event has occurred (block 345) and performs a corresponding effect (block 350). For instance, the trainer device 245 could detect when the user has extended his hand towards the trainer device 245 (e.g., through the use of one or more camera devices within the trainer device 245 or within another storytelling device), and could activate a vibration mechanism (e.g., a gear and weight combination device) within the trainer device 245 in order to cause the trainer device 245 to vibrate. Doing so creates the perception that the user has used the "force" on the trainer device 245 in accordance with the story being told. The controller 120 then advances the context of the story to a next context (block 355), reconfigures the storytelling devices accordingly (block 360), and the method 300 ends.

Figures 4, 5:
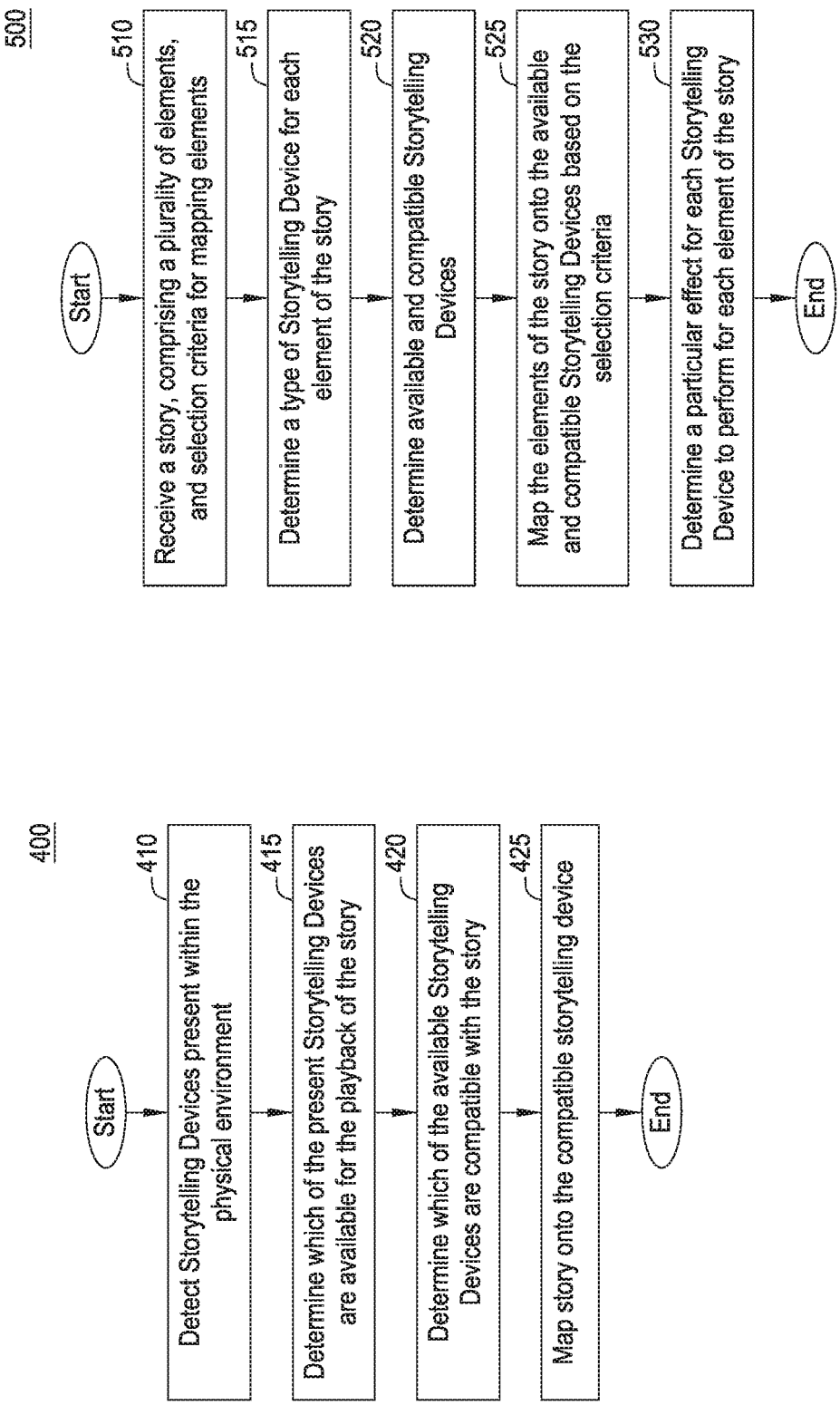
FIG. 4 is a flow diagram illustrating determining a plurality of storytelling devices, according to one embodiment described herein.
FIG. 5 is a flow diagram illustrating mapping a story onto a plurality of storytelling devices, according to one embodiment described herein.

FIG. 4 is a flow diagram illustrating determining a plurality of storytelling devices, according to one embodiment described herein. As shown, the method 400 begins at block 410, where the controller 120 detects a plurality of storytelling devices that are physically present within the physical environment. Generally, it is broadly contemplated that the controller 120 could use any number of communication techniques for detecting the storytelling devices. Examples of such techniques include Bluetooth® technologies, 802.1 wireless networking technologies, RFID technologies, and so on. More generally, any technique for detecting devices that are physically proximate to the controller 120 may be used, in accordance with the functionality described herein.

The controller 120 then determines which of the present storytelling devices are available for playing out a particular story (block 415). As discussed above, a device may be considered unavailable if the storytelling device is currently involved in playing out a different story, if the device lacks the charge to complete the storytelling experience (e.g., the device has a low battery), and more generally if the device cannot (or is unlikely to be able to) initiate or complete the storytelling experience.

Additionally, the controller 120 determines which of the available storytelling devices are compatible with the particular story (block 420). That is, while a magic lamp storytelling device may be available within the physical environment, the magic lamp may not be thematically consistent with a Star Wars® themed story. Accordingly, the controller 120 could determine that while the magic lamp is present and available for playing out the story, the magic lamp device is not compatible with the particular story. As discussed above, the story could specify pairs of stimulus events and corresponding actions to be performed by a storytelling device, and could designate the device or type of device to perform each of these pairs. Thus, for example, the story could specify a particular action is to be performed specifically by a Yoda storytelling device, while another action could be designated for any Star Wars® hero device. If the controller 120 determines that a particular device does not map to any of the stimulus event/action pairs, the controller 120 could determine the particular device is not compatible with the story.

Once the controller 120 determines which devices are compatible with the story, the controller 120 maps the pairs of stimulus events and corresponding actions onto the compatible device (block 425), and the method 400 ends. Thus, continuing the above example, the controller 120 could map the Yoda-specific action to the Yoda storytelling device, and could map the Star Wars® hero-specific action onto the Yoda storytelling device or another available storytelling device that satisfies the criteria (e.g., an Obi-Wan storytelling device).

FIG. 5 is a flow diagram illustrating mapping a story onto a plurality of storytelling devices, according to one embodiment described herein. As shown, the method 500 begins at block 510, where the controller 120 receives a story that comprises a plurality of elements and selection criteria for use in mapping the elements onto storytelling devices. Here, each of the plurality elements could include a stimulus event(s) and a corresponding action(s) to be taken in responsive to an occurrence of the stimulus event(s).

The controller 120 then determines a device type for each element of the story (block 515). As discussed above, the story could specify a specific type of device for a stimulus event/action pair (e.g., a magic lamp device), or could specify a type of device to which the stimulus event/pair can be mapped (e.g., a Star Wars® villain type of device). The controller 120 also determines which storytelling devices are available and compatible within the physical environment (block 520). The controller 120 then maps the elements of the story onto the determined storytelling devices, based on the selection criteria for each of the story elements (block 525).

Additionally, the controller 120 determines a particular effect for each of the storytelling devices to perform for each element of the story (block 530), and the method 500 ends. For instance, a particular element comprising the occurrence of a stimulus event could be mapped to any available Star Wars® villain storytelling device, and the controller 120 could determine what action the device should taken responsive to the stimulus event being performed. For a particular element, the performed action may remain consistent regardless of the storytelling device the element is mapped to. As an example, in the laser deflection storyline discussed above, a scorekeeping task could be mapped to the training device 245 (e.g., to generate the projection 255) or to the augmented reality glasses 215 (e.g., to generate an augmented reality scoreboard). Here, while the technologies for generating the scoreboard differ between the two devices, the action of update the hit counter or the miss counter remains the same regardless of the device used. However, for other elements, the performed action may vary depending on the type of device the element is mapped to. For example, a dialogue action may vary depending on which Star Wars® villain the particular element is mapped to, in order to provide thematically consistent dialogue for the story. Thus, in such an example, the controller 120 could determine the effect the storytelling device should performed for the given element, based on the type of the storytelling device.

Figure 6:
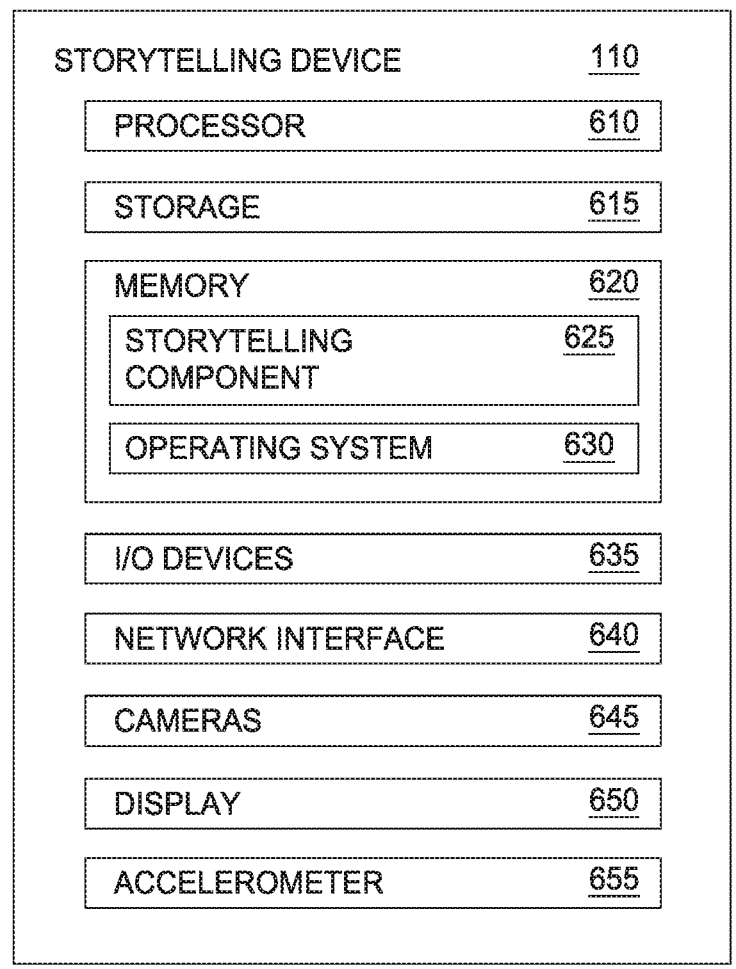
FIG. 6 is a block diagram illustrating a storytelling device, according to one embodiment described herein.

An example of a storytelling device is shown in FIG. 6, which is a block diagram illustrating a storytelling device configured with a storytelling component, according to one embodiment described herein. In this example, the storytelling device 110 includes, without limitation, a processor 610, storage 615, memory 620, I/O devices 635, a network interface 640, camera devices 645, a display devices 650 and an accelerometer device 655. Generally, the processor 610 retrieves and executes programming instructions stored in the memory 620. Processor 610 is included to be representative of a single CPU, multiple CPUs, a single CPU having multiple processing cores, GPUs having multiple execution paths, and the like. The memory 620 is generally included to be representative of a random access memory. The network interface 640 enables the storytelling device 110 to connect to a data communications network (e.g., wired Ethernet connection or an 802.11 wireless network). Further, while the depicted embodiment illustrates the components of a particular storytelling device, one of ordinary skill in the art will recognize that storytelling devices may use a variety of different hardware architectures. Moreover, it is explicitly contemplated that embodiments may be implemented using any device or computer system capable of performing the functions described herein.

The memory 620 represents any memory sufficiently large to hold the necessary programs and data structures. Memory 620 could be one or a combination of memory devices, including Random Access Memory, nonvolatile or backup memory (e.g., programmable or Flash memories, read-only memories, etc.). In addition, memory 620 and storage 615 may be considered to include memory physically located elsewhere; for example, on another computer communicatively coupled to the storytelling device 110. Illustratively, the memory 620 includes a storytelling component 625 and an operating system 630. The operating system 630 generally controls the execution of application programs on the storytelling device 100. Examples of operating system 630 include UNIX, a version of the Microsoft Windows® operating system, and distributions of the Linux® operating system. Additional examples of operating system 630 include custom operating systems for gaming consoles, including the custom operating systems for systems such as the Nintendo DS® and Sony PSP®.

The I/O devices 635 represent a wide variety of input and output devices, including displays, keyboards, touch screens, and so on. For instance, the I/O devices 635 may include a display device used to provide a user interface. As an example, the display may provide a touch sensitive surface allowing the user to select different applications and options within an application (e.g., to select an instance of digital media content to view). Additionally, the I/O devices 635 may include a set of buttons, switches or other physical device mechanisms for controlling the storytelling device 110. Additionally, the I/O devices 635 could include mechanized components or other components that enable the storytelling device 110 to take a physical action (e.g., vibrating, walking around the room, gesturing, facial expressions, etc.).

The storytelling component 625 may be configured to recognize various stimulus events and to associate a respective one or more actions with each of the various stimulus events. Upon detecting that one of the stimulus events has occurred, the storytelling component 625 could perform the corresponding one or more actions. For instance, the storytelling device 110 could be a stuffed animal monkey could be configured with a storytelling component 625 that, upon detecting that a holographic genie projection has appeared, could cause the mechanized monkey toy to cower in fear and to emit whimpering noises in fright of the genie. Additionally, the storytelling component 625 could determine which actions to perform based on a current context of a story being told using a multitude of storytelling devices 110. That is, the mechanized monkey toy may be configured to behave differently when the genie first appears within the story (e.g., appearing afraid of the genie), but may behave differently when the genie comes to the user's rescue later in the story (e.g., appearing grateful upon seeing the genie). Thus, the storytelling component 625 could be configured to react differently to a given stimulus event, depending on the current context within the story.

As discussed above, the storytelling component 625 may detect the occurrence of the stimulus event in a variety of different ways. For instance, the storytelling component 625 could use the camera devices 645 within the storytelling device 110 to detect when a projected image appears or to track the movement of the user. As another example, the storytelling component 625 could use the accelerometer 655 to detect when the user rubs the storytelling device 110 with his hand (e.g., where the device 110 is a magic lamp). Additionally, the storytelling component 625 could use other I/O devices 635 to make such a determination, such as touch-sensitive device capable of detecting when and how the user is touching the device 110 (e.g., a capacitive sensing or conductance sensing tactile surface). Furthermore, the controller 120 could transmit a message to the device 110 (e.g., using Wi-Fi or Bluetooth communications), indicating that a particular stimulus event has occurred. More generally, any technique capable of detecting the occurrence of some predefined event may be used, in accordance with the functionality described herein.

Additionally, the storytelling device 110 may be configured with logic and/or hardware to determine its geographic, physical position within the physical world. Examples of such logic and/or hardware include GPS logic and a global positioning system (GPS) transmitter, and geolocation software that uses time of flight or angle of flight or both (from a multiplicity of wireless sources such as cell towers, television broadcast towers, or wireless network devices). More generally, any technique (known or unknown) for determining a device's physical position in the real world may be used, consistent with the functionality described herein.

Additionally, embodiments may synchronize with existing media devices such as TVs, web devices, smart phones and e-books, in providing an immersive storytelling experience. For example, a storytelling magic lantern (e.g., a storytelling device 110) could sense events on a TV show the user is currently watching or a video game the user is currently playing (e.g., through communications with the TV and/or video game system, using one or more cameras, using a microphone, etc.). In response to detecting such a stimulus event, the magic lantern could react in a context-appropriate manner and precisely at exactly the right time. For instance, upon detecting that an ESPN® newscaster on a TV the user is currently watching made a reference to an upcoming football game between the Giants® and the Panthers®, and upon determining that the Giants® won their previous game, the magic lantern could say "Boy, I sure hope the Giants® can pull it off again this weekend!" (e.g., using a text-to-speech synthesizer and one or more speaker devices).

As another example, a storytelling device 110 could communicate with an eBook reader controlled by the user to determine which book the user is currently reading and which page of a particular book the eBook reader is currently displaying. The storytelling device 110 could then chime in at exactly the right time (e.g., momentarily after the user has turned the page) with commentary and/or actions to enhance the story being told on the legacy media platform (i.e., the book the user is reading).

Figure 7:
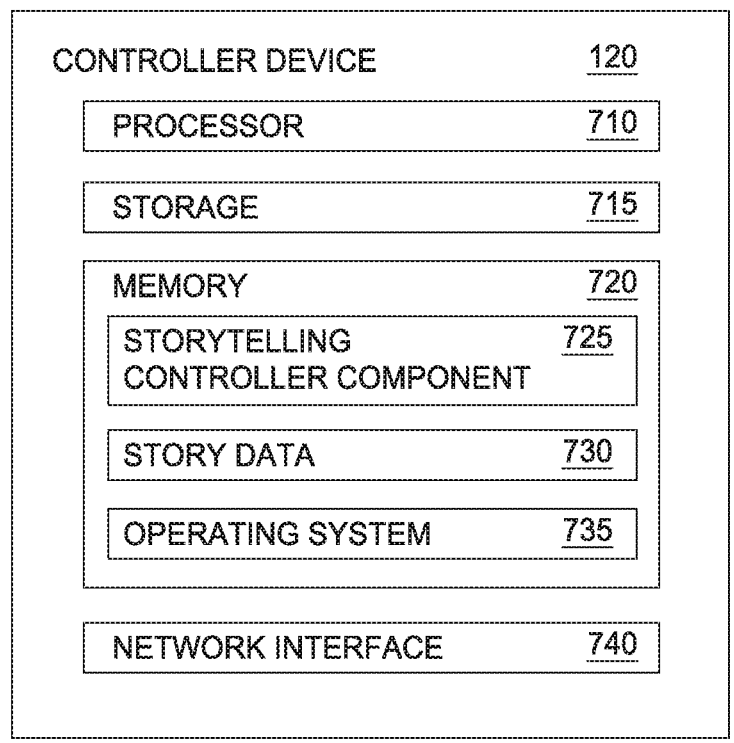
FIG. 7 is a block diagram illustrating a controller device, according to one embodiment described herein.

FIG. 7 illustrates an example of a controller device, according to one embodiment described herein. As shown, the controller 120 includes a processor 710, storage 715, memory 720, and a network interface 740. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The network interface 740 enables the controller device 120 to connect to a data communications network (e.g., wired Ethernet connection or an 802.11 wireless network). Further, while the depicted embodiment illustrates the components of a particular controller device 120, one of ordinary skill in the art will recognize that storytelling devices may use a variety of different hardware architectures. Moreover, it is explicitly contemplated that embodiments may be implemented using any device or computer system capable of performing the functions described herein.

The memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the controller device 120. Illustratively, the memory 720 includes a storytelling controller component 725, story data 730 and an operating system 735. The operating system 735 generally controls the execution of application programs on the controller device 120. Examples of operating system 735 include UNIX, a version of the Microsoft Windows® operating system, and distributions of the Linux® operating system. Additional examples of operating system 735 include custom operating systems for gaming consoles, including the custom operating systems for systems such as the Nintendo DS® and Sony PSP®.

Generally, the storytelling controller component 725 configures the storytelling devices 110 to perform particular actions responsive to detected stimuli and a current context of a current story being told. For instance, in one embodiment, the storytelling controller component 725 transmits logic (or a series of commands) for recognizing particular events and performing a corresponding action(s) to each of the storytelling devices 110, before the telling of a particular story begins. In such an embodiment, the storytelling devices 110 could then use input/output devices (e.g., cameras, microphones, wireless transceivers, infrared sensors, etc.) on the storytelling devices 110 to detect when a particular event occurs. For instance, a device 110 could use a camera to detect when a particular projection appears, and could then perform a corresponding action in response, based on a current context of the story being told. As another example, the device 110 could receive a wireless signal (e.g., using Bluetooth communications) from another one of the devices 110, indicating that a particular action has been performed. The device 110 could then perform the corresponding action responsive to receiving the signal. One advantage to such an embodiment is that the devices 110 may react to a given stimulus relatively quickly, since the reaction logic already resides on the storytelling device 110.

In a particular embodiment, the storytelling controller component 725 is configured to directly control the actions of the storytelling devices 110. For instance, the storytelling controller component 725 could transmit a message to a first one of the devices 110, instructing the device 110 to perform a particular action to begin the story. The device 110 could then perform the specified action. In one embodiment, the device 110 could transmit an acknowledgement message back to the storytelling controller component 725 once the action is successfully performed. In a particular embodiment, the storytelling controller component 725 could automatically assume that the device 110 has performed the action after some predetermined period of time since the storytelling controller component 725 transmitted the message has elapsed.

In any event, once the storytelling controller component 725 determines (or presumes) that the action has been performed, the storytelling controller component 725 could identify one or more other storytelling devices 110 that, according to a particular story, can react responsive to the performed action. As discussed above, in some circumstances, the storytelling controller component 725 could determine a subset of storytelling devices 110 that are capable of reacting to the performed action, that should react in response to the performed action. For instance, the storytelling controller component 725 could determine that six different devices 110 are capable of reacting both physically and audibly to the performed action. The storytelling controller component 725 could then select a subset of the six storytelling devices 110 that should react to the particular stimulus event (i.e., the performed action). The storytelling controller component 725 could also determine how each of the devices 110 should react. As an example, the storytelling controller component 725 could determine that all six devices 110 should react physically to the stimulus event, but that only two of the six devices 110 should react audibly to the stimulus event. Advantageously, doing so helps to prevent the devices from "talking over each other" and helps ensure that the user can clearly hear and understand the audible reactions of the device 110.

Generally speaking, the storytelling devices 110 and the controller 120 may be implemented in any number of different ways, consistent with the present disclosure. With respect to hardware, embodiments may employ a modular design for maximum hardware reusability across different storytelling devices. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

It is explicitly contemplated that the controller 120 may also reside within a cloud computing environment. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a controller 120 could reside as a software application executing in the cloud. For example, the controller 120 could communicate with storytelling devices 110 within the user's home (e.g., via the Internet) and could transmit the story data to each of the storytelling devices 110. Generally, the story data sent to each device 110 may include a series of actions and corresponding stimuli. The storytelling devices 110 could then use the received story data to create the immersive storytelling environment. Doing so allows the storytelling devices 110 to access the controller 120 using any network connected to the cloud (e.g., the Internet).

Additionally, with respect to software, embodiments may include features such as abstraction layers and virtual machines that allow applications and media to play on a multitude of hardware platforms and devices. For example, embodiments could employ a software architecture implemented in execution of processors and input/output devices, having as a minimum an application layer, a middleware layer and a kernel layer. Furthermore, the data interfaces and API's between these different layers could utilize abstractions that are agnostic as to the specific hardware and I/O devices, allowing a "write once port many" environment.

Similarly, embodiments could include middleware, such as frameworks, libraries and other utilities that allow anyone skilled in scripting and programming to quickly create storytelling scripts and experiences using pre-fabricated "building blocks" that are provide for efficient coding and runtime operation. Generally, such abstractions and virtual machines may enable the storytelling environment to interface easily with legacy media devices and platforms such as television, e-books and websites.

In one embodiment, the storytelling system architecture is modular with respect to the controller 120, such that the system can function equally as well regardless of whether the storytelling controller 120 is a centralized controller, a remote, cloud controller or a distributed controller implemented through a mesh network in which individual device communicate in a peer-to-peer mode to cooperate in providing a multi-element storytelling experience. Additionally, any individual storytelling element (e.g., a storytelling device 110 such as a magic lamp), may at different times operate either as a stand-alone device, a device that synchronizes with a legacy media device (e.g., a TV, a video game platform, an eBook reader, etc.), a device that cooperates through peer-to-peer communication with another device (e.g., another storytelling device 110), a device that is controlled by a centralized story controller, and/or a device that is controlled by a remote cloud controller. In this fashion, a single storytelling device could function in either a thin client (i.e., where the bulk of processing is performed locally) or fat client mode (i.e., where the bulk of processing is performed locally) in a peer-to-peer mesh network topology, a hub-and-spoke star topology, a ring topology, a virtualized cloud topology, or more generally any topology, known or unknown, consistent with the functionality described herein.

Figure 8:
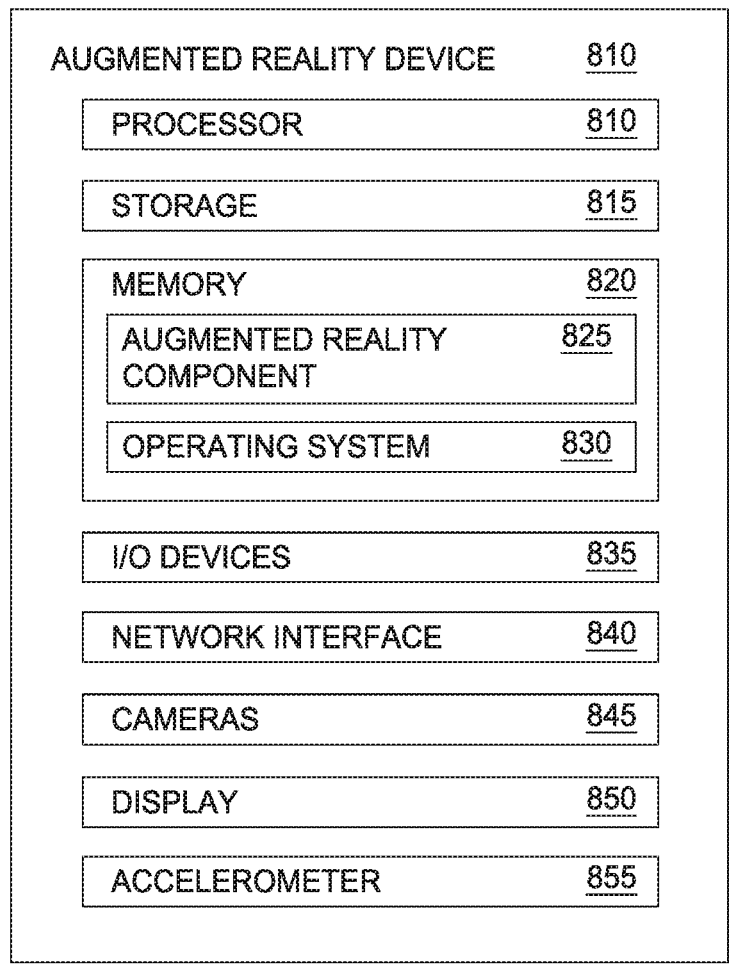
FIG. 8 is a block diagram illustrating an augmented reality device, according to one embodiment described herein.

As discussed above, in one embodiment, at least one of the storytelling devices is an augmented reality device. An example of augmented reality device according to one embodiment described herein is shown in FIG. 8. Here, the augmented reality device 800 includes, without limitation, a processor 810, storage 815, memory 820, I/O devices 835, a network interface 840, camera devices 845, a display devices 850 and an accelerometer device 855. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The network interface 840 enables the augmented reality device 800 to connect to a data communications network (e.g., wired Ethernet connection or an 802.11 wireless network). Further, while the depicted embodiment illustrates the components of a particular augmented reality device, one of ordinary skill in the art will recognize that storytelling devices may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the augmented reality device 800. Illustratively, the memory 820 includes an augmented reality component 825 and an operating system 830. The operating system 830 generally controls the execution of application programs on the augmented reality device 800. Examples of operating system 830 include UNIX, a version of the Microsoft Windows® operating system, and distributions of the Linux® operating system. Additional examples of operating system 830 include custom operating systems for gaming consoles, including the custom operating systems for systems such as the Nintendo DS® and Sony PSP®.

The I/O devices 835 represent a wide variety of input and output devices, including displays, keyboards, touch screens, and so on. For instance, the I/O devices 835 may include a display device used to provide a user interface. As an example, the display may provide a touch sensitive surface allowing the user to select different applications and options within an application (e.g., to select an instance of digital media content to view). Additionally, the I/O devices 835 may include a set of buttons, switches or other physical device mechanisms for controlling the augmented reality device 800. Additionally, the I/O devices 835 could include mechanized components or other components that enable the augmented reality device 800 to take a physical action (e.g., vibrating, walking around the room, gesturing, facial expressions, etc.).

Generally, the augmented reality component 825 is configured to capture one or more frames of a physical environment using the cameras 845 and to display an augmented depiction of these frames on the display 850. For instance, assume that the user aims the camera(s) 845 towards a table, such that the table surface is depicted on the display 850 of the device 800. In addition to depicting the physical environment, the augmented reality component 825 could be configured to augment the displayed scene to include one or more virtual objects. As an example, the augmented reality component 825 could display a series of frames depicting an animated virtual character moving around on the surface of the table. The augmented reality component 825 can also be configured to augment the depicted real-world scene by removing one or more objects from the scene.

For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Software on the augmented device may use such a camera device(s) to capture a visual scene of a physical environment (e.g., using one or more cameras on the augmented reality device). For instance, the software could capture a visual scene that includes a first user. Additionally, the software could receive visual scene data for a second user from a second augmented reality device. Here, the visual scene data could be captured using one or more cameras on or connected to the second augmented reality device. The visual scene data for the second user could be transmitted, for example, across a physical connection between the two augmented reality devices, a wireless connection between the two augmented reality devices (e.g., a Bluetooth connection), or across a network (e.g., the Internet).

The software could then render a sequence of frames for display which depict the first user and the second user in an augmented reality world. For instance, the software could render the depiction of the first user based on the visual scene captured on the augmented reality device, and could render the depiction of the second user based on the visual scene data received from the second augmented reality device. The rendered sequence of frames could then be displayed on one or more display devices connected to the augmented reality device. Advantageously, doing so provides an augmented reality world in which multiple users may exist and interact with one another.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A system, comprising:
 a plurality of electronic devices, each configured to produce an effect based on a current context of a story in response to detecting an occurrence of a stimulus event, wherein the effect is at least one of an auditory and a visual effect, and wherein at least one of the respective stimulus events for each of the plurality of electronic devices comprises detecting, based on data values collected from one or more sensor devices, performance of a user action by a first user in a physical environment in which the plurality of electronic devices and the first user are located; and a controller device configured to:
   determine that the plurality of electronic devices are present in the physical environment and are available and compatible with the story, through wireless communication with each of the plurality of electronic devices;
   manage a playback of the story within the physical environment, by transmitting one or more instructions to each of the plurality of electronic devices to adjust the stimulus event and the effect of each of the plurality of electronic devices, based on the current context of the story;
   during the playback of the story, determine that a first one of the plurality of electronic devices has become unavailable; and
   adjust the playback of the story within the physical environment, by transmitting one or more instructions to each of a second plurality of electronic devices, non-inclusive of the first electronic device, to update the stimulus event and the effect of each of the second plurality of electronic devices, based on an updated context of the story.

2. The system of claim 1, wherein the story comprises a plurality of stimulus event and effect pairs, wherein each of the pairs corresponds to a type of electronic device.

3. The system of claim 2, wherein the story further comprises one or more branches, wherein each of the one or more branches comprises two or more storyline arcs, wherein each of the storyline arcs includes at least one of the stimulus event and effect pairs.

4. The system of claim 3, wherein the controller device is further configured to associate a plurality of elements of the story with compatible electronic devices based on a type of electronic device.

5. The system of claim 3, wherein the controller device is configured to select one of the two or more storyline arcs, for use in playback of the story.

6. The system of claim 5, wherein the selection of the storyline arc is based on at least one of an aggregate state of the story, a historical state based on previously played stories, a user profile for a user, and information about the user.

7. The system of claim 1, wherein the visual effect comprises at least one of a real projection, a virtual display, and a physical action by a electronic device.

8. The system of claim 1, wherein the auditory effect is either localized or non-localized, with respect to a electronic device producing the auditory effect.

9. The system of claim 1, wherein another stimulus event for at least one of the plurality of electronic devices comprises at least one of:
   a first electronic device coming within a predefined distance of a second electronic device.

10. The system of claim 1, wherein one of the effects is further based on a location of a first electronic device.

11. The system of claim 1, wherein the stimulus event is based on a location of the user that is determined by a camera on a first electronic device.

12. The system of claim 1, wherein the stimulus event is based on a location of an object in the environment that is determined by a camera on a first electronic device.

13. The system of claim 1, wherein another stimulus event for at least one of the plurality of electronic devices comprises a verbal statement by a user within the physical environment.

14. The system of claim 1, wherein another stimulus event for at least one of the plurality of electronic devices comprises movement of the at least one of the plurality of electronic devices, wherein the movement comprises at least one of acceleration, roll, yaw and pitch of the at least one electronic device.

15. The system of claim 1, wherein the controller device is further configured to maintain state data comprising at least one of:
   a current playback position within the story;
   a list of events that have occurred in the environment;
   state information for at least one of the plurality of electronic devices; and
   state information for the user in the context of the current story.

16. The system of claim 1, wherein another stimulus event for at least one of the plurality of electronic devices comprises an action corresponding to an existing media device.

17. The system of claim 1, wherein another stimulus event for at least one of the plurality of electronic devices comprises a physical user interaction with the electronic device.

18. A non-transitory computer-readable medium containing computer program code that, when executed, performs an operation comprising:
   providing a plurality of electronic devices, each configured to produce an effect based on a current context of a story in response to a stimulus event, wherein the effect is at least one of an auditory and a visual effect, and wherein at least one of the respective stimulus events for each of the plurality of electronic devices comprises detecting, based on data values collected from one or more sensor devices, performance of a user action by a first user in a physical environment in which the plurality of electronic devices and the first user are located;
   determining that the plurality of electronic devices are present in the physical environment and are available and compatible with the story, through wireless communication with each of the plurality of electronic devices;
   transmitting one or more instructions to each of the plurality of electronic devices to manage a playback of the story within the physical environment, by adjusting the stimulus event and the effect of each of the plurality of electronic devices, based on the current context of the story; and
   during the playback of the story:
      determining that a first one of the plurality of electronic devices has become unavailable;
      determining that a second electronic device, distinct from the electronic devices in the plurality of electronic devices is present within the physical environment and is currently available and compatible with the story; and
      adjusting the playback of the story within the physical environment, by transmitting one or more instructions to each of a second plurality of electronic devices, non-inclusive of the first electronic device and inclusive of the second electronic device, to update the stimulus event and the effect of each of the second plurality of electronic devices, based on an updated context of the story.

19. A system, comprising:
   a plurality of electronic devices, each configured to produce an effect based on a current context of a story in response to detecting an occurrence of a stimulus event, wherein the effect is at least one of an auditory and a visual effect, and wherein at least one of the respective stimulus events for each of the plurality of electronic devices comprises detecting performance of a user action by a first user in a physical environment in which the plurality of electronic devices and the first user are located; and a controller device configured to:
  determine that the plurality of electronic devices are present in the physical environment and are available and compatible with the story, through wireless communication with each of the plurality of electronic devices;
  manage a playback of the story within the physical environment, comprising:
    transmitting one or more instructions to each of the plurality of electronic devices to adjust the stimulus event and the effect of each of the plurality of electronic devices, based on the current context of the story;
    upon determining that a first one of the plurality of electronic devices has become unavailable, transmitting one or more instructions to each of a second plurality of electronic devices, non-inclusive of the first electronic device, to update the stimulus event and the effect of each of the second plurality of electronic devices, based on an updated context of the story;
    upon determining that a second electronic device, distinct from the electronic devices in the plurality of electronic devices is present within the physical environment and is currently available and compatible with the story, transmitting one or more instructions to each of a second plurality of electronic devices, non-inclusive of the first electronic device and inclusive of the second electronic device, to update the stimulus event and the effect of each of the second plurality of electronic devices, based on an updated context of the story, wherein at least one of the stimulus event and the effects is reassigned from the first electronic device to the second electronic device, and wherein the second electronic device was not available when the controller device determined that the plurality of electronic devices were present in the physical environment and were available and compatible with the story.

20. The system of claim 19, wherein the controller device is further configured to maintain state data comprising at least one of:
  a current playback position within the story;
  a list of events that have occurred in the environment;
  state information for at least one of the plurality of electronic devices; and
  state information for the user in the context of the current story.

* * * * *